United States Patent [19]

Packman

[11] 4,135,363
[45] Jan. 23, 1979

[54] DEVICE TO PROVIDE FLOW INVERSION IN A TURBOFAN EXHAUST TAILPIPE TO ACHIEVE LOW JET NOISE

[75] Inventor: Allan B. Packman, West Hartford, Conn.

[73] Assignee: United Technologies Corporation, Hartford, Conn.

[21] Appl. No.: 763,199

[22] Filed: Jan. 27, 1977

Related U.S. Application Data

[63] Continuation-in-part of Ser. No. 687,079, May 13, 1976, abandoned.

[51] Int. Cl.² ............................................. F02K 3/02
[52] U.S. Cl. ................................... 60/262; 181/213; 181/220
[58] Field of Search ............. 60/262, 204, 224, 226 R; 181/214, 220, 213, 214

[56] References Cited

U.S. PATENT DOCUMENTS

| 3,527,317 | 9/1970 | Motsinger | 60/227 X |
| 3,578,106 | 5/1971 | Ellis | 181/220 |
| 3,655,009 | 4/1972 | Hilbig | 181/220 |
| 3,861,140 | 1/1975 | Krabacher | 60/262 |
| 3,968,647 | 7/1976 | Boudigues | 60/262 |
| 3,987,621 | 10/1976 | Sabatella, Jr. et al. | 60/262 |
| 4,066,214 | 1/1978 | Johnson | 60/271 X |

Primary Examiner—Robert E. Garrett
Assistant Examiner—Donald S. Holland
Attorney, Agent, or Firm—Norman Friedland

[57] ABSTRACT

Jet noise generation occasioned from the gaseous streams in the coaxial streams of a turbofan engine when they as well as the ambient stream encounter is reduced by designing the engine so that the value of the true velocity of the outer stream is substantially higher than the value of the true velocity of the inner stream. It is contemplated that for a turbofan engine the fan stream and primary or engine core streams are inverted so that the higher velocity stream would be in the outer coaxial passage immediately upstream of the point where the streams discharge to ambient. A modified conventional lobe mixer is utilized to invert flow streams.

4 Claims, 2 Drawing Figures

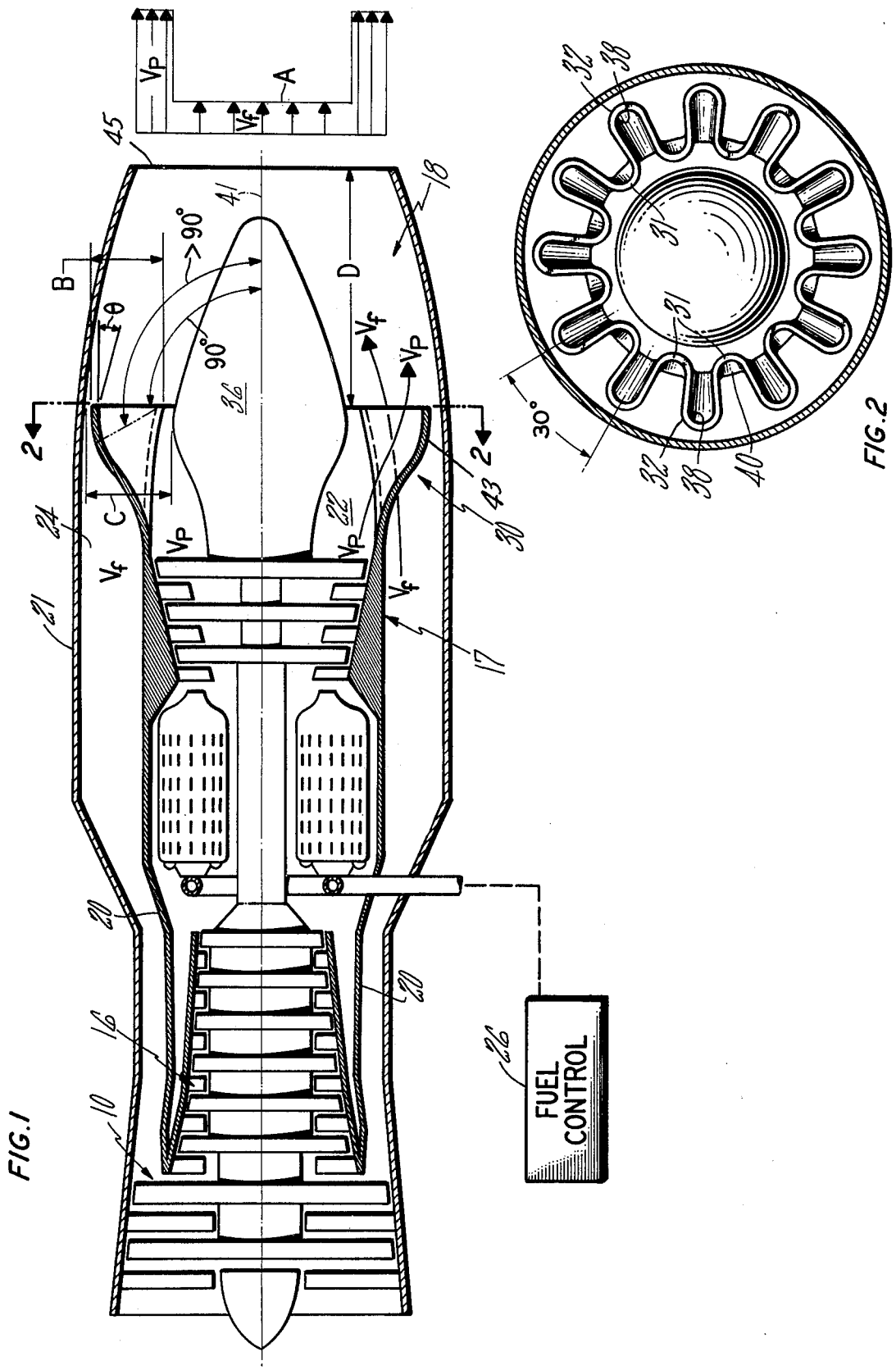

DEVICE TO PROVIDE FLOW INVERSION IN A TURBOFAN EXHAUST TAILPIPE TO ACHIEVE LOW JET NOISE

CROSS REFERENCE

This is a continuation-in-part application of U.S. patent application Ser. No. 687,079 filed on May 13, 1976, now abandoned.

This patent application relates to the subject matter of U.S. patent application Ser. Nos. 685,947 and 685,948, entitled Low Jet Noise Turbofan Cycle filed by Allan B. Packman and Hilary Kozlowski and entitled Exhaust Flow Inversion For Low Jet Noise filed by Allan B. Packman on the same date as this application and assigned to the same assignee. U.S. patent application Ser. No. 685,948 is now abandoned.

BACKGROUND OF THE INVENTION

This invention relates to turbofan engines and particularly to a modified lobed mixing means for inverting the fan and core engine coannular streams so that the higher velocity stream is in the outer annular passage downstream of the turbine ahead of the exhaust so as to reduce the generation of jet noise.

Noise generation within or created by a jet engine is, to say the least, complex. Noise emanates from numerous sources, as from the rotating parts or the effect of the flow stream within its gas path, particularly flowing through nozzles and the engine inlet, engine vibrations and the like. This invention is solely concerned with the noise that is generated as a result of shearing of the air particles occasioned by the exhaust streams and the ambient air encountering at different velocities, otherwise referred to as jet noise. Such noise is particularly prevalent, as for example, in a fan-jet where the fan and primary exhausts and the ambient air meet at relative velocities.

Since the gas velocities exhausting from a turbofan is less than for a turbojet for equivalent thrusts, the noise is reduced sufficiently for subsonic flight aircraft. However, in considering such an engine for supersonic aircraft the jet noise resulting from the high velocities at which the exhaust discharges is objectionable.

The current day practice is to design the turbofan engine so that the cooler, lower velocity fan discharge air streams surrounds the inner and high velocity high temperature primary exhaust. It has been a well established and accepted theory in gas turbine engine art, that turbofan jet noise emanating from the shear turbulence occasioned when the fan and primary flow meet each other and also the ambient air could be substantially reduced by keeping the velocities of both streams discharging from the exhaust nozzle equal. Typically, a mechanical noise suppressor would be employed to violently mix the two streams so that both streams would thoroughly mix previous to exhausting from the engine tail pipe resulting in an overall reduced velocity.

Another technique for reducing jet noise generation is disclosed in U.S. patent application Ser. No. 476,127 filed on June 3, 1974, now U.S. Pat. No. 3,987,621, by Sabettalla and Kane, Jr. assigned to the same assignee, which considers varying the engine's operation at certain aircraft flight regimes. Essentially, this patent application is concerned with placing the noisier gaseous stream on the outside of the coaxial streams in order to facilitate the treatment thereof with mechanical suppressors. This is accomplished by controlling the fan pressure ratio, bypass ratio and power of the gas generator.

And still another technique, although intended to treat fan noise generation, is shown in U.S. Pat. No. 3,527,317 granted on Sept. 8, 1970 and is touched on here to avoid confusion with the technique described in this patent application. U.S. Pat. No. 3,527,317, supra, shows coaxial streams where the fan discharge air surrounds the primary core air stream. The noise, without treatment, propagated by the fan at the discharge end radiates radially producing an unwanted sideline noise. In one embodiment the technique employed in U.S. Pat. No. 3,527,317, supra, is to create a separate annular stream whose sonic speed is higher than that of the fan stream. It should be clearly understood that sonic speed is a totally different physical characteristic than true velocity. Sonic velocity is the measurement of sound passing through a particular medium. True velocity, on the other hand is this value multiplied by Mach Number. Thus, sonic speed of one stream may be higher than the other while the true velocity of the first mentioned stream is lower and vice versa. In another embodiment U.S. Pat. No. 3,527,317, supra, suggests that in addition the velocity of the shroud stream should be equal to or higher than the fan stream. Hence a requirement of the shroud stream is that it have a higher sonic speed and a velocity that is equal to or greater than the fan stream. A stream that has a lower sonic speed may also have a higher velocity than a stream to which it is being compared.

This invention contemplates designing a turbofan engine intially so that the outer streams, be it the fan or primary stream, or coaxial streams, has a higher true velocity value than the inner stream. This is in direct contradiction to what is believed to be the well established principle of minimum jet noise which theorizes that the true velocity of the outer stream should be equal to the value of the inner stream. I have found that contrary to these established beliefs, static testing has shown that merely creating the outer stream to flow at the higher velocity than the value of the inner stream had produced an unexpected reduction in noise.

It is contemplated that a turbofan engine could power a supersonic aircraft with significant noise reduction by designing the cycle so that the outer stream be at a higher velocity, at least 200 feet per second, relative to the inner stream (when compared to a cycle of the same thrust and flow where the velocity of these streams are equal or the outer stream is less than the inner stream) by inverting the higher velocity engine core stream with the fan stream immediately ahead of the engine exhaust nozzle. To this end, we have found that a conventional lobed mixer can be modified to effectuate flow stream inversion without incurring significant mixing.

SUMMARY OF THE INVENTION

An object of this invention is to provide for a turbofan engine means for reducing jet noise generation by inverting the true velocity profile so that the higher velocity stream in a coaxial flow stream arrangement is the outer stream rather than the inner stream, by use of a lobe mixer.

A still further object of this invention is to provide in a turbofan engine means for controlling the velocity of the fan stream so that its value is greater than the value of the primary or core streams by inverting each of said streams ahead of their being exhausted to ambient by a lobe member that has an exit angle substantially equal to or less than 0° relative to the engine center line. Also, design criteria that are critical are the height of the lobe relative to annular height of the passage, the number of lobes, the curvature of the lobe channels and the distance from the exit of the lobe member to the engine exhaust nozzle. Each of these are selected so that the lobe member produces substantial inversions of the flow, rather than total mixing of the flow.

Other features and advantages will be apparent from the specification and claims and from the accompanying drawings which illustrate an embodiment of the invention.

BRIEF DESCRIPTION OF THE DRAWING

FIG. 1 is a schematic view of a turbofan engine, and
FIG. 2 is an end view partly in section and partly in elevation showing a means for inverting the coaxial flow stream.

DESCRIPTION OF THE PREFERRED EMBODIMENT

For the sake of describing this invention the FIG. 1 is a schematic of a turbofan engine exemplifying a typical engine having a coaxial flow streams and as one skilled in this art will appreciate the principles of this invention have application with other engine configurations. Essentially, the engine has these coannular streams consist of fan, fan stream ($V_f$) and the primary or core engine stream ($V_p$). The fan stream ahead of the turbine is the outer stream and downstream of the turbine is inverted to the inner stream and the core engine stream is the inner stream ahead of the turbine and the outer stream downstream of the turbine.

The turbofan engine is the twin spool design and includes fan section 10, compressor section 16, turbine section 17 (where the first turbine drives the compressor and the latter turbine drives the fan) and exhaust section 18. The engine case 20 surrounds the core section of the engine and defines the inner annular passage 22 and the outer case 21 surrounding fan 10 and engine case 20 defines an outer annular passage 24. As schematically illustrated fuel feeds the burner section by a suitable commercially available fuel control 26.

The velocity of the fan stream is less than the velocity of the core stream and in order to produce a velocity profile defined by the velocity profile graph indicated by reference letter A which is desired the streams are inverted by the flow stream inverting mechanism generally illustrated by reference numeral 30. While any means may be employed to invert the flow streams, mechanism for accomplishing this may be modified lobed mixer which is of the type that has symmetrical inner and outer lobes 31 and 32, respectively circumferentially mounted about and spaced from plug 36, defining a plurality of inner passages or channels 38 and alternately spaced outer passages or channels 40. Typically, the conventional lobed mixer directs the flow so that the engine core air and fan air move substantially axially with slight radial directional movement to cause violent and thorough mixing. Inverter 30 in this embodiment is designed so that the radial direction is modified to the extent that limited mixing occurs and the flow is inverted so that the engine core stream is in the outer annular passage and the fan stream is in the inner annular passage, as indicated by the graph A. A conventional mixer can be modified to achieve this feature by designing the lobes so that the junction point where the streams discharge therefrom forms an angle with the engine center line that equals substantially 0°. Each lobe has an exit plane through its exit end. Thus, as illustrated in FIG. 1, angle $\theta = 0°$. The angle of the exit plane of each lobe of inverter 30 relative to the center line 41 is substantially equal to 90° as shown. It was also found that this angle can be increased and inversion will still occur. However reducing this angle to less than 90° produces mixing without inversion. Additionally, it is important that the contours of wall 43 of inverter 30 is shaped that flow separation does not occur, otherwise the device will not invert the flow. The number of lobes should be such that there is sufficient spacings between lobes, and a 30° angle between adjacent lobe center lines was found to be satisfactory. Of significance in the design is the distance the height of the lobe relative to the inner diameter of the engine annular passage wall. The lobe height (dimension B of FIG. 1) relative to the height of the annular space (dimension C) should be substantially 80%. If the gap between the top of lobe and wall 21 becomes excessive, inversion of the flow will not take place. The distance from the exit end of member 30 to the exhaust nozzle 45 (dimension D on FIG. 1) has an affect on the degree of inversion and mixing. The shorter the distance, the higher the amount of inversion, and conversely, the greater the distance the greater the amount of mixing. A satisfactory dimension, which has proven to be efficacious was 1.4 times the diameter of the exhaust nozzle 45.

Actual data obtained from static model testing show that the jet noise of a coannular nozzle with $V_f > V_p$ compared to the jet noise of a fully mixed jet of the same thrust and airflow exhibits a lower perceived noise level. The fully mixed single jet is produced, in an ideal sense, by totally mixing the fan and core streams of the coannular nozzle in a common tail pipe. This data indicated that for fan stream temperature of 1500° F., peak perceived noise level (PNL) when plotted as a function of fan jet velocity (in the case of the fully mixed jet, fan jet velocity is defined as the velocity the fan stream would be if expanded to ambient pressure without mixing), the mixed jet is 3 dB noisier than the $V_f > V_p$ jet at $V_f = 1900$ fps (i.e. when the ratio $V_f/V_p = 1.36$). At $V_f = 2800$ fps ($V_f/V_p = 2.0$) the fully mixed jet is 6 dB noisier than the $V_f/V_p = 1$ jet. Comparing a lower value of fan jet temperature (1150° F.) at the higher fan velocities, the noise of the $V_f/V_p = 1.0$ jet is similar to that shown in the plot of the 1500° F. case. However, as the fan velocity decreases to lower values, the noise reduction also decreases. In fact, at $V_f = V_p = 1400$ fps, the noise level is the same for the coannular and mixed cases. That is to say that the coannular nozzle operating with equal velocity in each stream produces the same noise as a single fully mixed jet of the same velocity and when the fan stream is higher a noise reduction is evidenced. A more comprehensive discussion of these tests can be seen in the American Institute of Aeronautics and Astronautics (AIAA) publication No. 76-149 given at the AIAA 14th Aerospace Science Meeting in Washington, D.C. in January 1976 and the NASA report CR-2628 referenced in said paper, and the contents thereof is incorporated herein by reference.

By modification of a conventional lobe mixer as described herein effectively serves to invert the two coannular streams in an economical manner which means is relatively easy to manufacture and assemble.

It should be understood that the invention is not limited to the particular embodiments shown and described herein, but that various changes and modifications may be made without departing from the spirit or scope of this novel concept as defined by the following claims.

I claim:

1. A fan-jet engine having a core engine portion including a turbine, and a fan portion, each portion defining coannular passages where the air from the fan exhaust in the outer coannular passage and the working medium in the core portion discharges from the turbine in the inner coannular passage, means downstream of said turbine for inverting said coannular passages so that the inner coannular stream exhausts from said engine as the outer coannular stream and the outer coannular stream exhausts from said engine in the inner coannular stream, said means including a plurality of circumferentially spaced lobes defining open ended channels, each alternate channel increasing in diameter in an upstream to downstream direction and each other alternate channel decreasing in diameter in an upstream to downstream direction, so that each alternate channel communicates with the outer coannular passage and the other alternate channel communicates with the inner coannular channel, the larger diameter portion of each increasing diameter channel having a discharge end having an outer wall, an exit plane through the exit end of each of the open ended channels, the angle of each plane through the exit end of said open ended channels with respect to the engine center line being equal and being more than 90° and the height of the lobe being 80% relative to the height of the annular passage in which the lobe is mounted.

2. A fan-jet engine as claimed in claim 1 including plug means centrally disposed in said engine and coaxially mounted relative to said flow stream inverting means and extending therethrough.

3. A fan-jet engine as claimed in claim 1 including an exhaust section and an exhaust nozzle wherein said means for inverting said coannular flow streams is disposed in said exhaust section, and the distance from the exit end of said open ended channels being substantially 1.4 times the diameter of the exhaust nozzle.

4. A fan-jet engine as in claim 1 wherein the number of lobes are selected so that the angle of the center lines of adjacent lobes equals substantially 30°.

* * * * *